Jan. 18, 1955     J. E. PALMER     2,699,716
FIELD MARKER
Filed Jan. 24, 1951

Inventor
John E. Palmer
By W. S. M. M.
ATTORNEY

United States Patent Office 2,699,716
Patented Jan. 18, 1955

2,699,716
FIELD MARKER
John E. Palmer, Calgary, Alberta, Canada

Application January 24, 1951, Serial No. 207,494

2 Claims. (Cl. 97—228)

This invention relates to a field marker, and the objects are to provide improved means to distinctly mark trails through a crop without damage to the crop, by towing the marker at a distance in rear of and to one side or the other of a tractor, and so designed as to prevent overlapping or under-coverage of the crop during spraying operations, and to provide well marked parallel trails through growing or full grown crops.

A further object is to provide a single disc type wheel as a mounting wheel only, which depends bearably from a framework, which framework trails a pair of bifurcated legs with end skids for the actual markings through the crop.

In consequence of the particular duo-convex shape of the mounting wheel there is no tendency to lift or throw soil when travelling, and the wheel scours itself due to the combined effectiveness of its canted position within its framed support and the convexity thereof. Still due to the outwardly convex shape of this wheel it leaves a clean, narrow and almost invisible furrow or track in the soil thus eliminating any danger of cutting or up-rooting planted seedlings.

Provision is made for adjusting the disc wheel as regards the angularity of its canted plane relative to the ground, the trailing marking legs and the hauling mechanism, in order to adapt it to variations in ground contours or unevenness, and to compensate any urge to deviate from the intended course.

This wheel is of hollow interior so formed by its convexo-concave construction, and contains a weight slung within and so positioned as to lower its center of gravity in order to assume a straight and true course through the crop.

This marker may be used as a right or left hand marker by proper adjustment of the draw cable from the tractor, and the proper canting of the wheel to lead it rather away than towards the hauling vehicle, and is connected to the cable by short twin cables of varied lengths so adjustable as to maintain a predetermined course parallel with that of the tractor.

The present invention shows a three point supported marker adaptable for both hilly and flat terrain, all parts remaining relatively rigid under both such conditions.

With these objects in view this invention consists in the novel features of construction hereinafter described and claimed, and in the drawings accompanying this specification it must be observed that similar numerals refer to similar parts throughout the different views.

Figure 1:
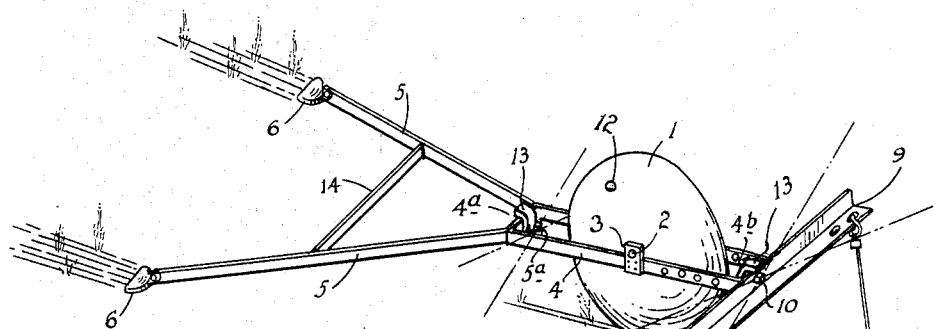
Fig. 1 is a view of the machine in perspective.
Figure 2:
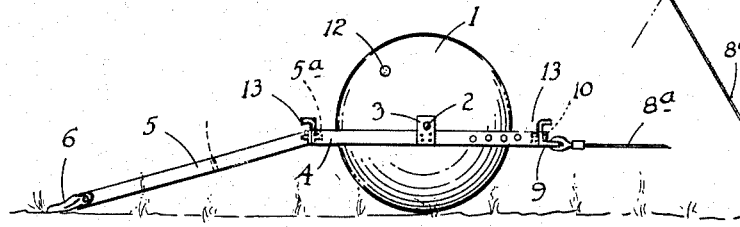
Fig. 2 is an elevational side view.
Figure 3:
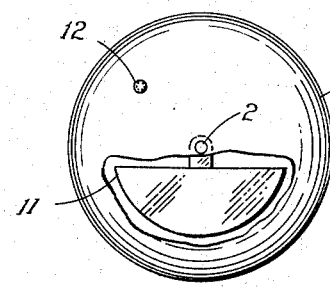
Fig. 3 is a detail view showing the disc wheel partly cut away to illustrate the swingable weight inside.
Figure 4:
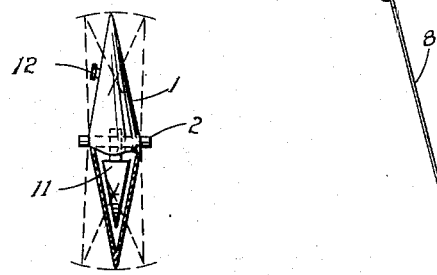
Fig. 4 is an end view partly sectionalized, and the possible canted positions of the wheel shown in broken lines.
Figure 5:
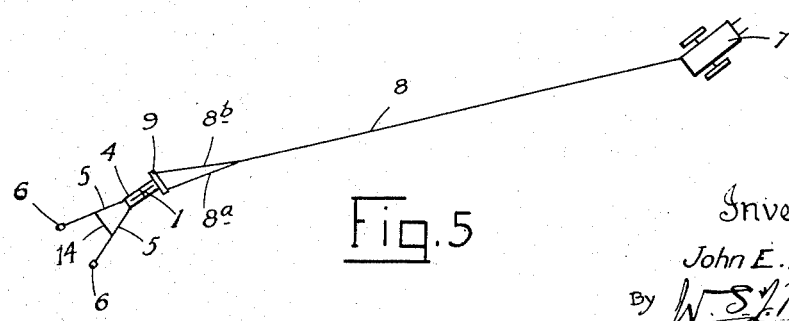
Fig. 5 is a diagrammatic representation in plan of the marker unit connected to a tractor in typical off-side position relative therewith.

In the drawings the numeral 1 refers to a ground-engaging disc wheel having its disc faces outwardly convexed, and it is therefore of convexo-concave construction leaving a hollow space between the two rim-connected disc members, the peripheral edge of one outside disc portion of the wheel being coincident with the peripheral edge of the other outside disc portion thereof.

An axle 2 passes through the center of the wheel 1, and is supported in bearing blocks 3 which are carried on a rectangular normally horizontal frame 4. A pair of field marker legs 5 are adjustably fixed to this frame, to the rear member 4a thereof, and by means of a bolt 5a. These legs bifurcate in spreading manner rearwardly from the rear end of the frame 4, and together with skids 6 attached to the trailing ends thereof, are the marking elements as the unit travels through a crop when hauled. The legs are pivotally adjustable about the bolt 5a to be secured thereby in varying planar relationship with the plane of the four sided frame 4.

The disc wheel 1 is the guiding member of this marker unit during operations when the marker is attached to and hauled by a motive vehicle, such as a tractor 7, and by means of a cable 8 and check cables 8a and 8b attached thereto. A singletree 9 is adjustably attached to the forward member 4b of the frame 4 by means of a bolt 10 to pivot thereabout, and is securable thereto by said bolt in any suitable planar position relative with the plane of the frame 4. The check cables are attached to the singletree, one at each end thereof, and the attaching points so arranged as to be below the axis of the wheel 1 to assure ground contact of the wheel.

The marker is accurately towed at any suitable angular plane of the disc wheel relative with the longitudinal axis of the tractor, and in a course parallel thereto. The track angle of the wheel 1 is adjusted by changing the comparative lengths of the two check cables 8a and 8b. The legs 5 prevent tipping of the marker, and at the same time provide a balanced stability.

The unit may be used for either right or left side operation by snapping the draw cables to the desired side of the tractor, and tipping the wheel 1 into a properly effective position.

The ground-contacting skids 6 on the legs 5 provide positive visible markings on each side of the track of the disc wheel 1, which latter acts as a guide rather than as a marker.

The two-faced outer convexity and hollow interior of the disc wheel 1 are important features in this improved marker, the former, as previously explained, assuring a clean surface and a minimum of crop damage, and the hollow interior of the wheel permitting the inclusion of a weight member 11 swingably depending from the axle 2 within the wheel, and thus lowering the center of gravity of the wheel and frame combination.

A stop lug 13 is welded on each fore and aft frame member 4b and 4a respectively, to prevent over-canting of the frame and wheel in relation to the adjusted positions of the legs and the singletree, as secured to the frame by the bolts 5a and 10 respectively. The wheel 1 is quickly set for right or left hand operation by manipulation of these two clamp bolts, the wheel being canted, and the legs and singletree being adjusted as to their angularity with the frame 4.

A plugged hole in one face of the wheel as shown at 12 is for oiling purposes. The marker legs 5 are braced by a transverse member 14 for added rigidity. In order to act merely as a stop for singletree and legs the two stops 13 must be in the center of the end members 4a and 4b, and the bolts 5a and 10 correspondingly centered.

What I claim and desire to secure by Letters Patent:

1. A field marker to be towed in a course parallel to and in a position rearwardly of and by means of a mobile machine for marking a pair of parallel impressions in and through a field crop, including a rectangular main frame, a single axle-mounted wheel supporting said frame, two sides of which wheel are concavo-convex forming a concavity between them, an axle for said wheel mounted perpendicularly to the fore and aft longitudinal axis of said frame and on the top thereof, weighting means within the concavity of said wheel as a means of lowering the center of gravity of the wheel and frame combination, a pair of marker legs disposed on and bifurcating rearwardly from the rear of said frame and adjustably secured thereto by a clamp bolt so that the wheel and frame may be canted relative to said legs, a singletree member attached transversely to the frame at its forward end and adjustably secured thereto by a clamp bolt so that the wheel and frame may be canted relative to the said singletree member, and cable means connecting the singletree to the mobile machine so that the two legs trail their parallel marking courses parallel to the course of the said machine and rearwardly thereof.

2. A field marker to be towed parallel to and rearwardly of and also by means of a mobile machine, for marking a pair of parallel impressions in a field crop or the soil, comprising in combination, a rectangular main frame, an axle-mounted wheel carrying said frame and itself composed of two concavo-convex discs joined at their peripheral edges to provide a concavity therebetween, weighting means within this concavity for lowering the center of gravity of the wheel and frame, a pair of marker legs adjustably connected by a bolt to the trailing end of said frame and bifurcating rearwardly therefrom, a stop on this trailing end of said frame to limit the canting position of the wheel and frame about said connecting bolt relatively with the legs, a singletree adjustably connected by a bolt to the leading end of said frame and substantially perpendicular to the longitudinal fore and aft axis thereof, a stop on the leading end of the frame to limit the canting position of the wheel and frame about said bolt relatively with the singletree, a skid for crop marking on the ground-engaging end of each said leg, and a towing cable to connect said marker with the mobile machine.

References Cited in the file of this patent

UNITED STATES PATENTS

| | | |
|---|---|---|
| 144,146 | Rynerson | Oct. 28, 1873 |
| 168,598 | Augspurger | Oct. 11, 1875 |
| 177,916 | Augspurger | May 30, 1876 |
| 319,725 | Johnson | June 9, 1885 |
| 482,406 | Geisendorfer | Sept. 13, 1892 |
| 919,967 | Slankard | Apr. 27, 1909 |
| 1,234,352 | Lane | July 24, 1917 |
| 2,511,521 | Watmough | June 13, 1950 |

FOREIGN PATENTS

| | | |
|---|---|---|
| 199,629 | Canada | Oct. 22, 1920 |
| 230,761 | Great Britain | Mar. 19, 1925 |